(12) United States Patent
Bolotin et al.

(10) Patent No.: US 12,732,933 B2
(45) Date of Patent: Sep. 8, 2026

(54) UPLINK TIMING ADJUSTMENT IN HIGH SPEED DEPLOYMENTS

(71) Applicant: INTEL CORPORATION, Santa Clara, CA (US)

(72) Inventors: Ilya Bolotin, Nizhny-Novgorod (RU); Meng Zhang, Beijing (CN); Andrey Chervyakov, Nizhny Novgorod (RU); Hua Li, Arlington, VA (US); Rui Huang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 311 days.

(21) Appl. No.: 18/570,722

(22) PCT Filed: Oct. 21, 2022

(86) PCT No.: PCT/US2022/047395
§ 371 (c)(1),
(2) Date: Dec. 15, 2023

(87) PCT Pub. No.: WO2023/069688
PCT Pub. Date: Apr. 27, 2023

(65) Prior Publication Data

US 2024/0292354 A1 Aug. 29, 2024

Related U.S. Application Data

(60) Provisional application No. 63/270,865, filed on Oct. 22, 2021.

(51) Int. Cl.
*H04W 56/00* (2009.01)
*H04L 27/26* (2006.01)
(Continued)

(52) U.S. Cl.
CPC ... *H04W 56/0015* (2013.01); *H04L 27/26025* (2021.01); *H04W 36/087* (2023.05);
(Continued)

(58) Field of Classification Search
CPC ............ H04W 56/0015; H04W 76/20; H04W 88/085; H04W 36/324; H04W 36/087;
(Continued)

(56) References Cited

U.S. PATENT DOCUMENTS

2015/0036664 A1 2/2015 Yuk et al.
2021/0044336 A1 2/2021 Lee et al.
(Continued)

FOREIGN PATENT DOCUMENTS

WO WO-2020041757 A1 2/2020
WO WO-2021088005 A1 5/2021
(Continued)

OTHER PUBLICATIONS

International Application Serial No. PCT/US2022/047395, International Search Report mailed Feb. 3, 2023, 3 pgs.
(Continued)

*Primary Examiner* — Angela Widhalm De Rodriguez
(74) *Attorney, Agent, or Firm* — Schwegman Lundberg & Woessner, P.A.

(57) ABSTRACT

An apparatus and system of uplink timing adjustment for frequency range 2 (FR2) communication with remote radio heads (RRHs) in a unidirectional high speed train (HST) deployment are described. A one-shot uplink timing adjustment is applied when a first value is greater than a second value. The first value is a difference between an end of a first transmission from a neighboring RRH and an end of reception of the first transmission at the UE less a difference between an end of a second transmission from a serving RRH and an end of reception of the second transmission at
(Continued)

the UE. The second value is a predetermined gradual timing adjustment set by a 3GPP specification, the predetermined adjustment plus a timing error limit, the predetermined adjustment plus twice a downlink error, or a multiple of the predetermined adjustment. The one-shot uplink timing adjustment is twice the first value.

11 Claims, 6 Drawing Sheets

(51) Int. Cl.

| | |
|---|---|
| ***H04W 36/08*** | (2009.01) |
| ***H04W 36/32*** | (2009.01) |
| ***H04W 48/20*** | (2009.01) |
| ***H04W 76/20*** | (2018.01) |
| ***H04W 88/08*** | (2009.01) |

(52) U.S. Cl.
CPC ..... *H04W 36/324* (2023.05); *H04W 56/0045* (2013.01); *H04W 76/20* (2018.02); *H04W 48/20* (2013.01); *H04W 88/085* (2013.01)

(58) Field of Classification Search
CPC .............. H04W 48/20; H04W 56/0045; H04L 27/26025; H04L 27/2662
See application file for complete search history.

(56) References Cited

U.S. PATENT DOCUMENTS

| | | | | |
|---|---|---|---|---|
| 2022/0217669 | A1* | 7/2022 | Bai | H04W 8/24 |
| 2023/0126659 | A1* | 4/2023 | Petrov | H04W 56/001<br>370/336 |
| 2024/0188016 | A1* | 6/2024 | Ohara | H04W 74/0833 |
| 2024/0349348 | A1* | 10/2024 | Dalsgaard | H04B 7/024 |

FOREIGN PATENT DOCUMENTS

| | | | | |
|---|---|---|---|---|
| WO | WO-2022208896 | A1 * | 10/2022 | H04W 56/0045 |
| WO | WO-2023011731 | A1 * | 2/2023 | H04B 7/06952 |
| WO | WO-2023069688 | A1 | 4/2023 | |

OTHER PUBLICATIONS

"International Application Serial No. PCT/US2022/047395, Written Opinion mailed Feb. 3, 2023", 4 pgs.

Apple, "Discussion on RRM requirement for FR2 HST", R4-2109367, 3GPP TSG RAN WG4 Meeting #99-e, (May 11, 2021), 4 pgs.

* cited by examiner

UPLINK TIMING ADJUSTMENT IN HIGH SPEED DEPLOYMENTS

PRIORITY CLAIM

This application is a U.S. National Stage Filing under 35 U.S.C. 371 from International Application No. PCT/US20232047395, filed Oct. 21, 2022 and published in English as WO 2023/069688 on Apr. 27, 2023, which claims the benefit of priority to U.S. Provisional Patent Application Ser. No. 63/270,865, filed Oct. 22, 2021, each of which is incorporated herein by reference in its entirety.

TECHNICAL FIELD

Embodiments pertain to next generation (NG) wireless networks. In particular, some embodiments relate to timing adjustments in new radio (NR) wireless networks and, more particularly to one-shot uplink timing adjustment triggering in NR frequency range 2 (FR2) high-speed train deployments.

BACKGROUND

The use and complexity of NG or NR wireless systems, which include 5G networks and are starting to include sixth generation (6G) networks among others, has increased due to both an increase in the types of UEs using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology, including complexities related to high-speed train deployments.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
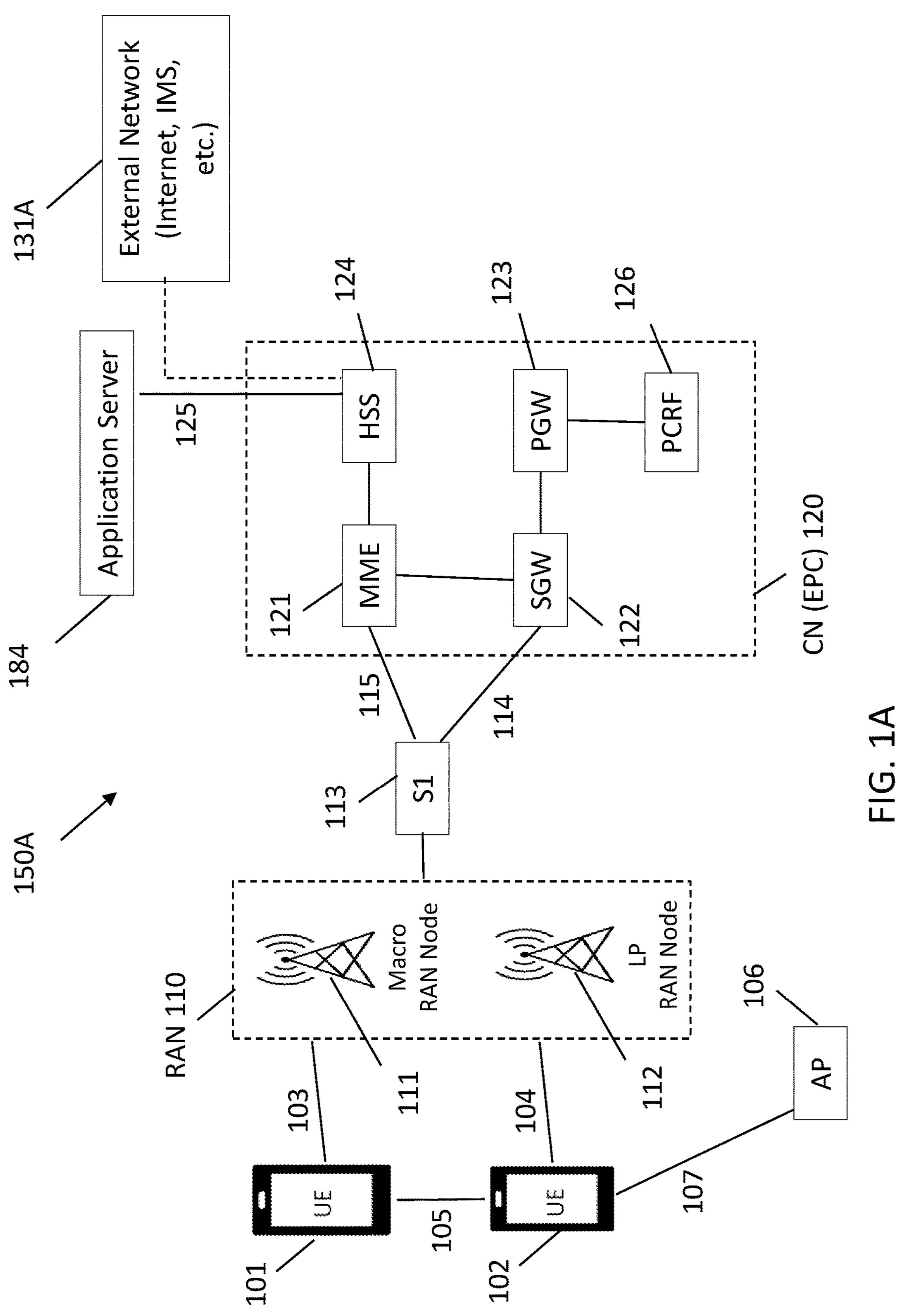
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G and later generation functions. Accordingly, although 5G will be referred to, it is to be understood that this is to extend as able to 6G (and later) structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHZ, 3.6-3.8 GHZ, and other frequencies and Spectrum Access System (SAS) in 3.55-3.7 GHZ and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The RAN 110 may contain one or more gNBs, one or more of which may be implemented by multiple units. Note that although gNBs may be referred to herein, the same aspects may apply to other generation NodeBs, such as 6$^{th}$ generation NodeBs—and thus may be alternately referred to as next generation NodeB (xNB).

Each of the gNBs may implement protocol entities in the 3GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB may be distributed in different units-a Central Unit (CU), at least one Distributed Unit (DU), and a Remote Radio Head (RRH). The CU may provide functionalities such as the control the transfer of user data, and effect mobility control, radio access network sharing, positioning, and session management, except those functions allocated exclusively to the DU.

The higher protocol layers (PDCP and RRC for the control plane/PDCP and SDAP for the user plane) may be implemented in the CU, and the RLC and MAC layers may be implemented in the DU. The PHY layer may be split, with the higher PHY layer also implemented in the DU, while the lower PHY layer is implemented in the RRH. The CU, DU and RRH may be implemented by different manufacturers, but may nevertheless be connected by the appropriate interfaces therebetween. The CU may be connected with multiple DUs.

The interfaces within the gNB include the E1 and fronthaul (F) F1 interface. The E1 interface may be between a CU control plane (gNB-CU-CP) and the CU user plane (gNB-CU-UP) and thus may support the exchange of signalling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the gNB-CU-CP and gNB-CU-UP using a non UE-associated signalling connection and UE-associated services that are related to a single UE and are associated with a UE-associated signalling connection that is maintained for the UE.

The F1 interface may be disposed between the CU and the DU. The CU may control the operation of the DU over the F1 interface. As the signalling in the gNB is split into control plane and user plane signalling, the F1 interface may be split into the F1-C interface for control plane signalling between the gNB-DU and the gNB-CU-CP, and the F1-U interface for user plane signalling between the gNB-DU and the gNB-CU-UP, which support control plane and user plane separation. The F1 interface may separate the Radio Network and Transport Network Layers and enable exchange of UE associated information and non-UE associated information. In addition, an F2 interface may be between the lower and upper parts of the NR PHY layer. The F2 interface may also be separated into F2-C and F2-U interfaces based on control plane and user plane functionalities.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signalling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VOIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a core network (CN) 120. The NG-RAN 110 can include a plurality of nodes, such as gNBs and NG-eNBs. The CN 120 (e.g., a 5G core network (5GC)) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
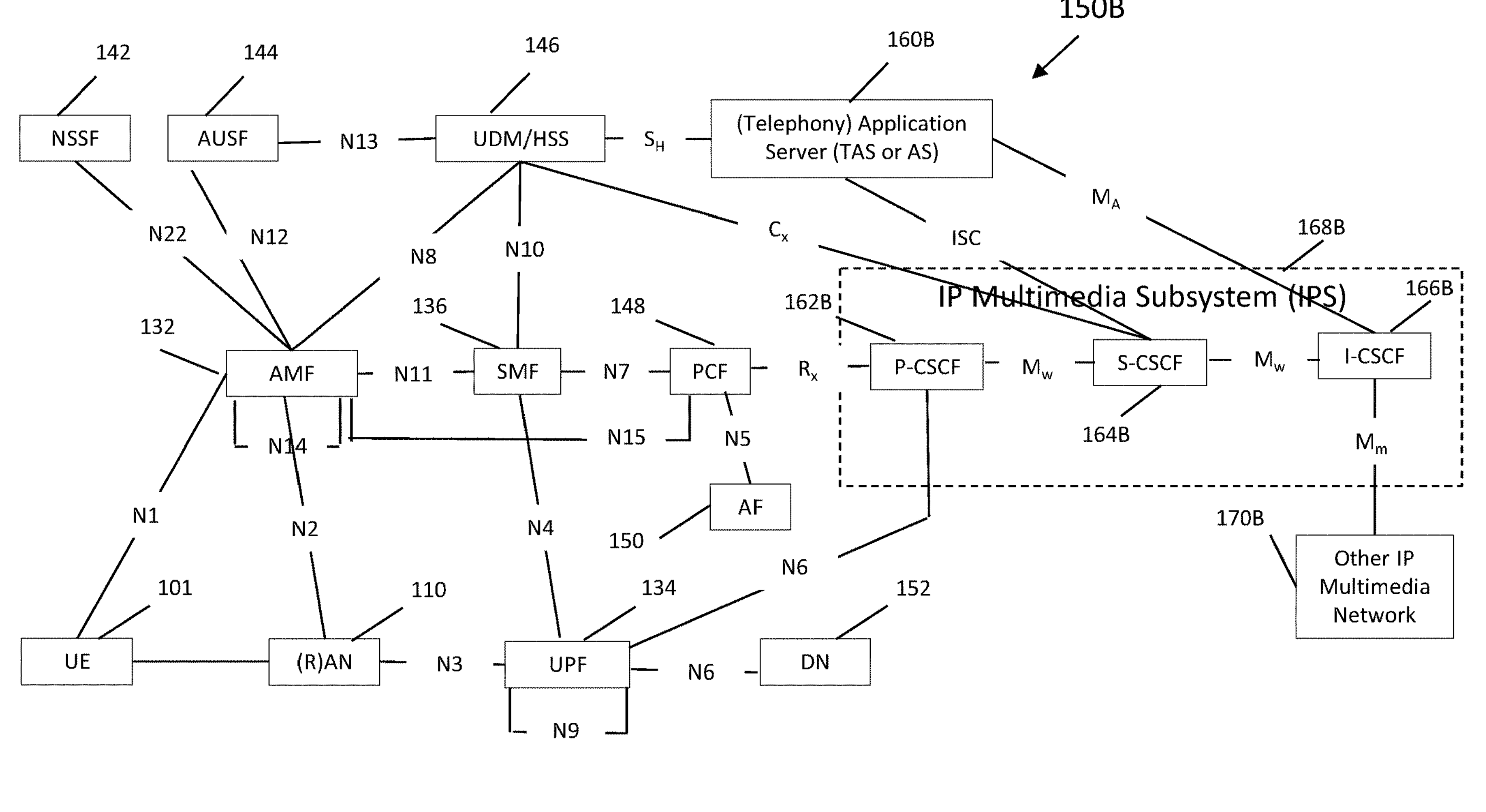
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other CN network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170B, e.g. an IMS operated by a different network operator.

In some aspects, the UDM/HSS 146 can be coupled to an application server (AS) 160B, which can include a telephony application server (TAS) or another application server. The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
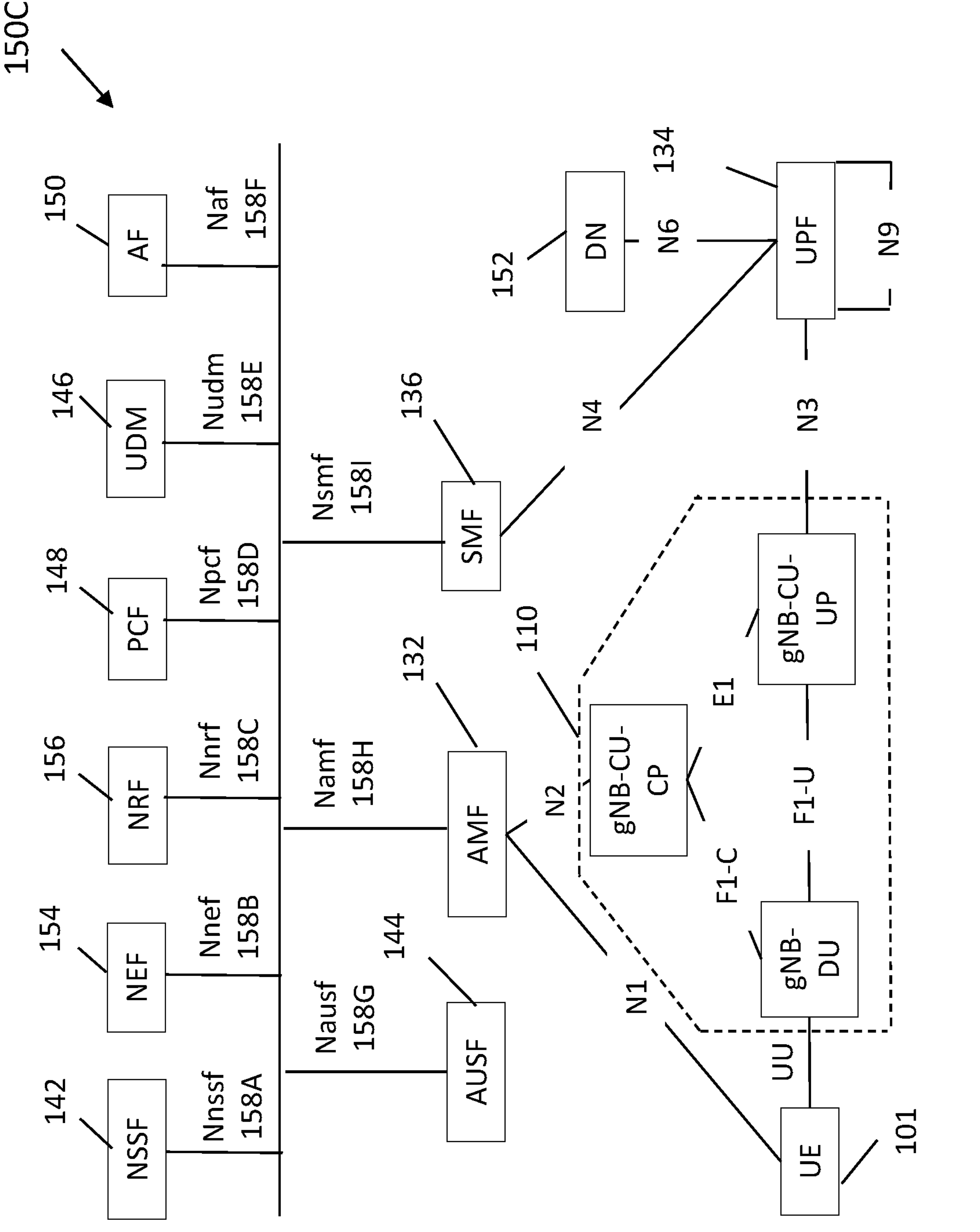
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
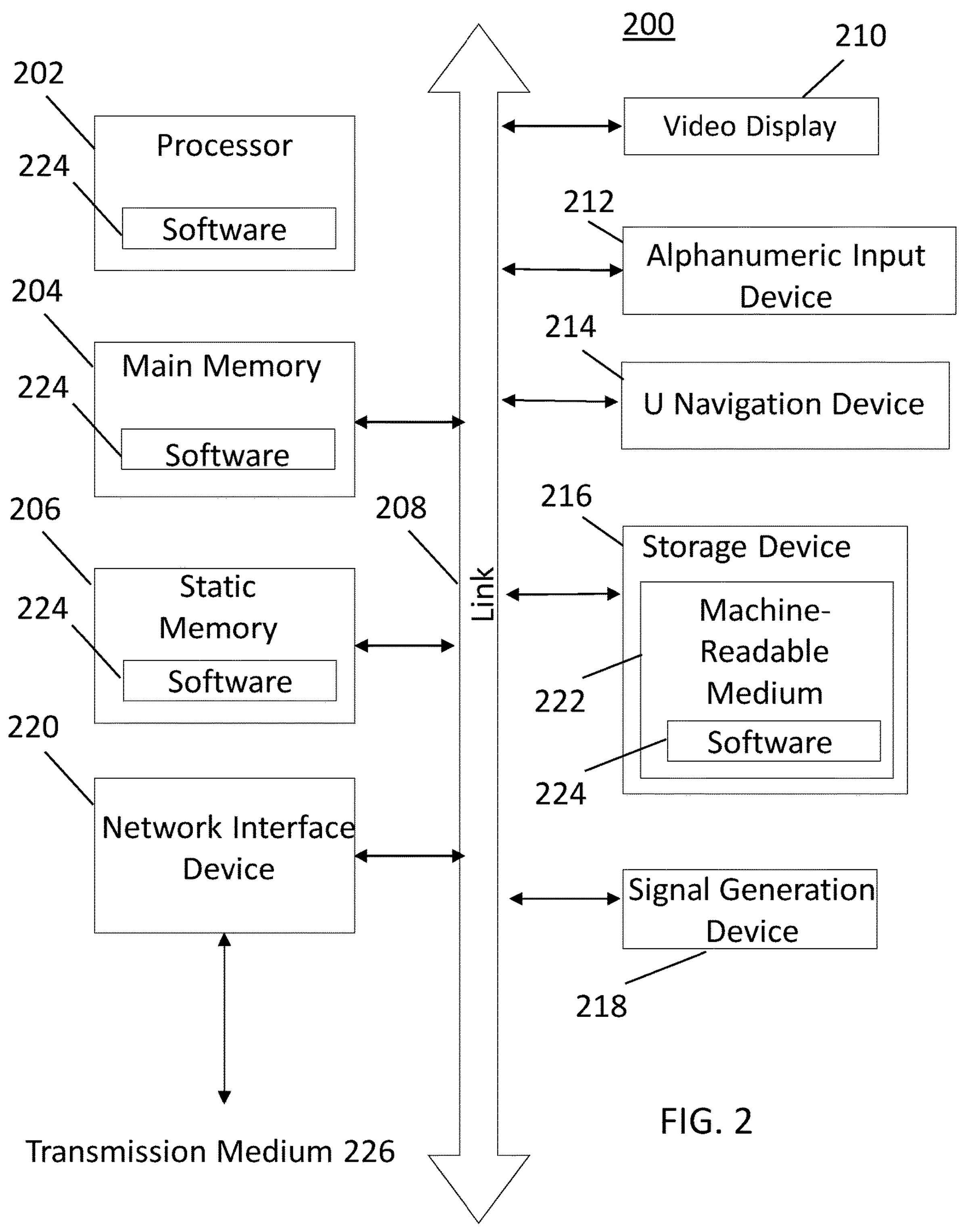
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (12V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHZ), ITS-G5B (i.e., Operation in European ITS frequency bands dedicated to ITS non-safety applications in the frequency range 5,855 GHz to 5,875 GHZ), ITS-G5C (i.e., Operation of ITS applications in the frequency range 5,470 GHz to 5,725 GHZ)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHZ and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHZ, 1710-2025 MHz, 2110-2200 MHz, 2300-2400 MHZ, 2.4-2.4835 GHz (note: it is an ISM band with global availability and it is used by Wi-Fi technology family (11b/g/n/ax) and also by Bluetooth), 2500-2690 MHZ, 698-790 MHZ, 610-790 MHz, 3400-3600 MHZ, 3400-3800 MHZ, 3800-4200 MHz, 3.55-3.7 GHZ (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHZ, 3800-4200 MHZ, 3.5 GHz bands, 700 MHz bands, bands within the 24.25-86 GHz range, etc.), spectrum made available under FCC's "Spectrum Frontier" 5G initiative (including 27.5-28.35 GHZ, 29.1-29.25 GHz, 31-31.3 GHZ, 37-38.6 GHZ, 38.6-40 GHz, 42-42.5 GHZ, 57-64 GHz, 71-76 GHZ, 81-86 GHz and 92-94 GHz, etc), the ITS (Intelligent Transport Systems) band of 5.9 GHZ (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHZ) and WiGig Band 4 (63.72-65.88 GHZ), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., lowithmedium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

5G networks extend beyond the traditional mobile broadband services to provide various new services such as internet of things (IoT), industrial control, autonomous driving, mission critical communications, etc. that may have ultra-low latency, ultra-high reliability, and high data capacity requirements due to safety and performance concerns. Some of the features in this document are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

As above, it is desirable for Rel-17 performance enhancements for NR in FR2 high speed scenarios to include specification of UE radio resource management (RRM) requirements for high speed train (HST) scenarios with speeds of up to 350 km/h. The FR2 frequencies, as known, range between about 26 GHz (K/Ka-, LMDS band) and about 60 GHz (V-band).

Figure 3:
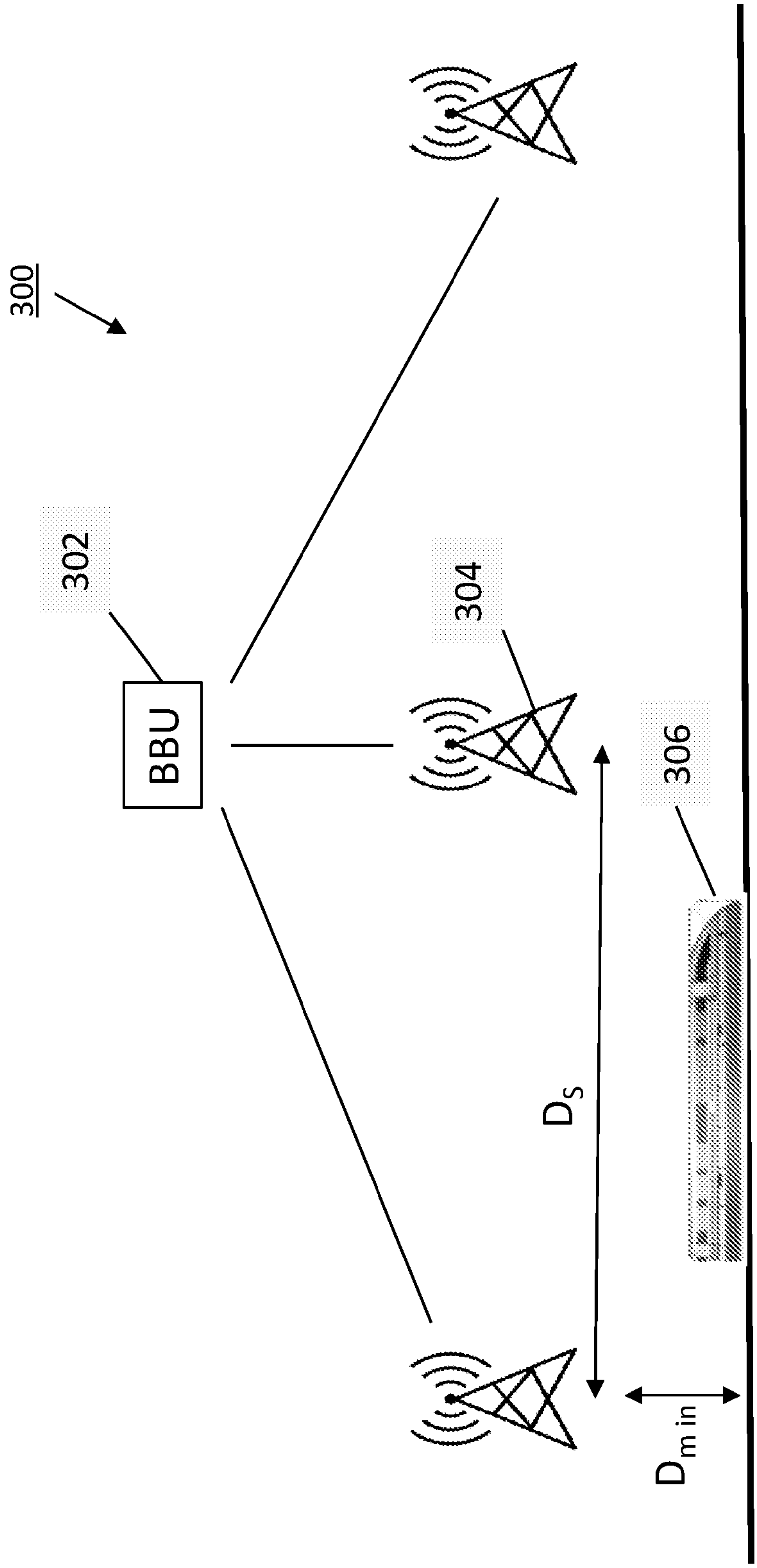
FIG. 3 illustrates a high speed train (HST) deployment in accordance with some embodiments.

FIG. 3 illustrates a HST deployment in accordance with some embodiments. As shown in the system 300 of FIG. 3, a cell has a baseband unit (BBU) 302 and multiple remote radio heads (RRHs) 304. The RRHs 304 are related to one cell and are each located a predetermined distance from the railway and from each other. The dynamic point switching (DPS) mode of operation is considered—a UE 306 (train or UEs in the train) communicates with only one RRH 304 at a time. Each RRH 304 is mapped with its own set of signaling system blocks (SSBs). There are two main options on how service can be provided in such scenario: unidirectional or bidirectional deployment. In unidirectional deployment, the RRHs 304 are equipped with antenna arrays that are directed in one direction along the railway. In this case, the UE 306 switches from a serving RRH 304 to a neighboring RRH 304, with the neighboring RRH 304 dependent on the movement direction of the UE 306. The propagation delays from neighboring cells at the location of one of the cells is relatively large, so switching between the neighboring cells at that location may lead to a relatively large propagation delay jump; this may cause significant system performance degradation. While downlink (DL) timing can be estimated using SSBs, uplink (UL) timing may still be an issue.

Figure 4:
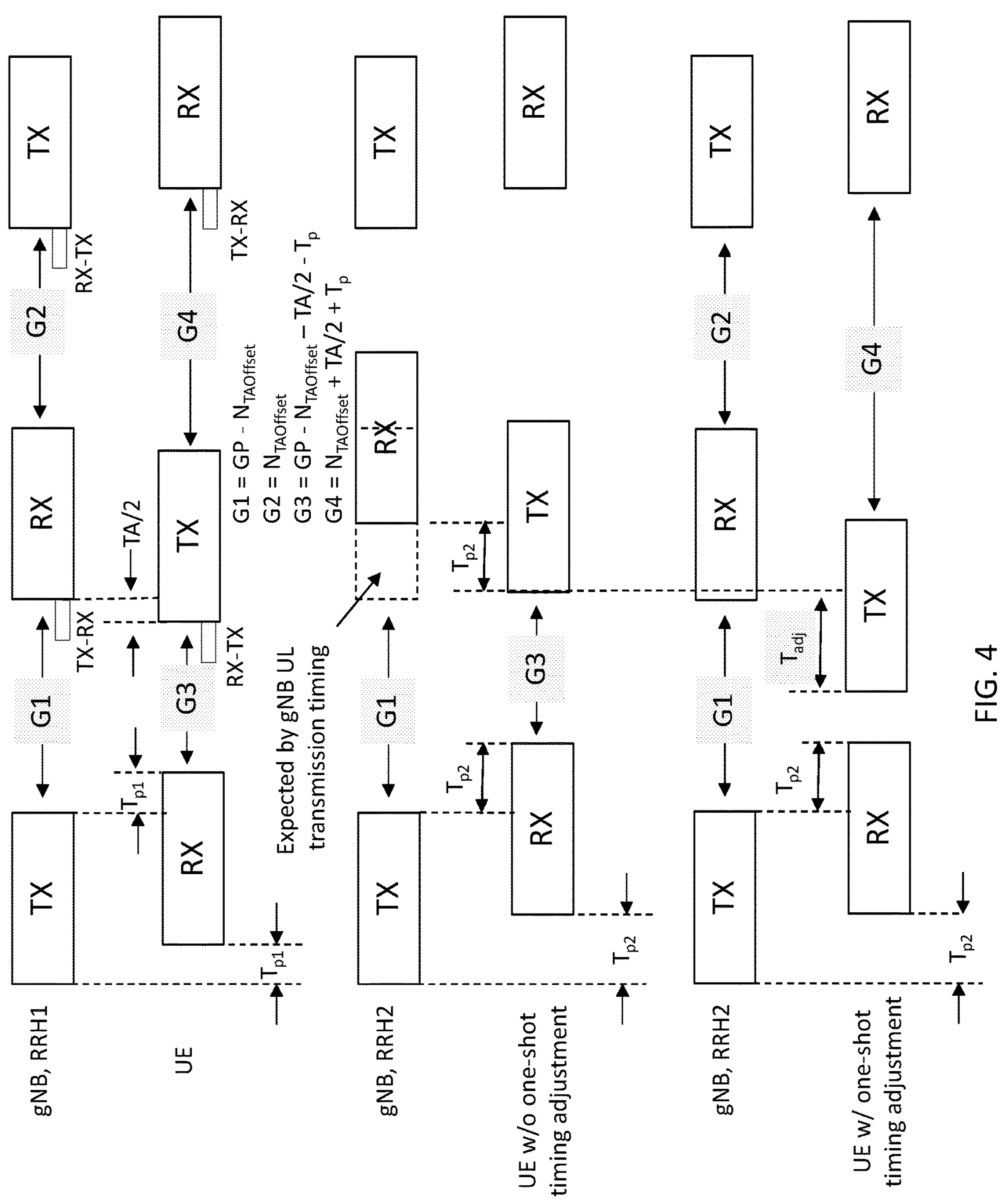
FIG. 4 illustrates frequency range 2 (FR2) HST time domain duplexing (TDD) operation timing in accordance with some embodiments.

FIG. 4 illustrates FR2 HST TDD operation timing in accordance with some embodiments. The uplink timing issue caused by a large propagation delay jump during switching between neighboring RRHs is illustrated in FIG. 4. At the top of FIG. 4, the TDD operation between the UE and gNB using RRH1 for FR2 communications is shown. Here, RRH1 is the RRH for which a random access channel (RACH) procedure was performed and a corresponding timing advance (TA) command was sent to UE to reflect the propagation delay $T_{p1}$.

After switching to RRH2 (shown in the middle of FIG. 4), the propagation delay jumps significantly ($T_{p2}>T_{p1}$). The round-trip delay is affected by that jump twice (in DL and UL), so the gNB expecting the UL signal to be received at the same timing as for RRH1 will actually receive the UL signal delayed by $2*(T_{p2}-T_{p1})$.

To resolve this issue, the UE may adjust its transmit timing by $T_{adj}=2*(T_{p2}-T_{p1})$ as shown in the bottom of FIG. 4. Currently, only gradual timing adjustment is permitted, where the adjustment step is relatively small. To deal with large timing jumps, a one-shot large timing adjustment may be applied. In particular, the UE compensation of propagation delay jump by may use a one-shot large uplink timing adjustment of $2*\Delta T$, where $\Delta T$ is the magnitude of the DL timing jump ($T_{p2}-T_{p1}$). In some embodiments, the one-shot large timing adjustment may be limited to FR2 communications.

Before enabling this feature the following list of issues should be discussed, including the threshold for applying the one-shot adjustment, the accuracy of the one-shot timing adjustment, and the maximum value limitation for the one-shot timing adjustment. To facilitate a solution for the mentioned issues, the focus herein is on the one-shot timing adjustment specifically for FR2 HST. Thus, the propagation delay jump is a result of the UE switching its serving RRH in an FR2 HST scenario.

Threshold for Applying One-Shot Adjustment

For a FR2 HST scenario there are certain moments when one-shot timing adjustment is to be used, specifically when RRH switching occurs. From the UE point of view, this point is at Transmission Configuration Indicator (TCI) state switching. TCI states are dynamically sent over in a downlink control information (DCI) message, which includes configurations such as quasi co-location (QCL)-relationships between the DL reference signals in one channel state information reference signal (CSI-RS) set and the physical downlink shared channel (PDSCH) demodulation reference signal (DMRS) ports. Thus, in some embodiments, a one-shot uplink timing adjustment of $2*\Delta T$ is used when the UE performs TCI state switching.

However, the adjustment may be employed in some embodiments only when switching between RRHs; that is, a one-shot timing adjustment may not be triggered every TCI state switching because such adjustment is not used for TCI state switching within one RRH. In this case, an additional condition that the timing jump is not compensated with a gradual timing adjustment can be considered: a one-shot timing adjustment of $2*(T_{p2}-T_{p1})$ may be enabled when the UE performs TCI state switching and ($T_{p2}-T_{p1}$) is larger than the gradual timing adjustment step.

S corollary to the use of an intermediate one-shot timing adjustment is that the one-shot large uplink timing adjustment of $2*\Delta T$ may be enabled when the UE performs TCI state switching and ($T_{p2}-T_{p1}$) is larger than X, where X may be a selectable or preconfigured amount. In particular, X may be the gradual timing adjustment step, the gradual timing adjustment step plus timing error limit, the gradual timing adjustment step plus 2*DL_error, or the gradual timing adjustment step multiplied by a value configured by the network.

Another option for triggering one-shot timing adjustment may be based on network signaling to the UE about deployment parameters. The deployment parameters may include, for example, beam-to-RRH mapping, number of beams per RRH, and/or distance between neighboring RRHs. The beam-to-RRH mapping (or TCI state to RRH mapping) parameter may include the UE applying the one-shot adjustment when a new TCI state is related to a new RRH according to the received mapping information. The number of beams per RRH parameter may include the UE applying the one-shot adjustment every N TCI state switches. The distance between neighboring RRHs parameter may include the UE applying the one-shot adjustment at TCI state switching after the UE passes the indicated distance (Ds in FIG. 3).

In some embodiments, the deployment information received from the network is used to define moments for one-shot large uplink timing adjustment of 2*ΔT. This information may comprise one or more of beam (or TCI state)-to-RRH mapping, number of beams per RRH and number of RRHs per gNB, and/or distance between neighboring RRHs, for example.

Accuracy of One-Shot Timing Adjustment

The accuracy of the one-shot timing adjustment may primarily depend on the accuracy of DL timing estimation (i.e., the determination of where the frame boundary lies). The adjustment may consider two estimations—for transmission from RRH1 ($T_{p1}$) and for transmission from RRH2 ($T_{p2}$). This gives an error of 2*DL_error in the timing jump estimation. The adjustment considers twice the magnitude of the timing jump, so the total accuracy of one-shot timing adjustment is an integer multiple of DL_error, e.g., 4*DL_error. The DL_error is the downlink timing estimation error and quantization error due to the time chip granularity that can be derived from the sampling time interval on DL transmissions as $1/(2\Delta f_{max}*N_f)$, where $\Delta f_{max}$ is the subcarrier spacing (SCS) size and $N_f$ is the fast Fourier transform (FFT) size.

Maximum Value Limitation for One-Shot Timing Adjustment

As shown in FIG. 4, if $T_{adj}$ is too large, there will be no time left for UE RX-TX switching. However, this should be addressed by use of a correct GP configuration, which is the responsibility of the network. The one-shot timing adjustment may be a non-trivial procedure for NR. Accordingly, signaling for support of this feature may be used from the UE and/or network. In this case, a network flag (i.e., a flag in a control message such as a radio resource control (RRC) message or downlink control information (DCI)) may be used to inform the UE that one-shot timing adjustment is expected from the UE. Similarly, UE capability signaling may include an indication whether one-shot timing adjustment is supported.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a user equipment (UE) configured for high-speed train (HST) deployment, the apparatus comprising memory and processing circuitry to configure the UE to:

receive signalling indicting a new Transmission Configuration Indicator (TCI) state for application across remote radio heads (RRHs);

apply an uplink (UL) timing adjustment for uplink transmissions to the RRHs after switching to the new TCI state, wherein based on an indicator in the received signalling, the processing circuitry is to apply one of a one-shot large UL timing adjustment and a gradual UL timing adjustment, wherein the one-shot large UL timing adjustment comprises a single large timing adjustment for the uplink transmissions to the RRHs after switching to the new TCI state and the gradual UL timing adjustment comprises a plurality of smaller timing adjustment steps, the single large timing adjustment being greater than a largest of any of the smaller timing adjustment steps, wherein the UL transmission comprises a transmission in frequency range 2 (FR2), wherein the indicator in the received signalling indicates that the UE is to apply the one-shot large UL timing adjustment when the UE indicated support for the one-shot large UL timing adjustment for the HST deployment, and wherein the indicator in the received signalling indicates that the UE is to apply the gradual UL timing adjustment when the UE did not indicate support for the one-shot large UL timing adjustment for the HST deployment, and wherein the memory is configured to store the one-shot large UL uplink timing adjustment.

2. The apparatus of claim 1, wherein the one-shot large UL timing adjustment is twice a timing difference between a downlink frame received with a prior TCI state and a downlink frame received with the new TCI state.

3. The apparatus of claim 1, wherein the processing circuitry further configures the UE to:

apply a prior TCI state for communicating with a first RRH prior to switching to the new TCI state, and apply the new TCI state for communicating with a second RRH switching to the new TCI state, wherein one of the one-shot large UL timing adjustment and the gradual UL timing adjustment is applied for uplink transmissions to second RRH.

4. The apparatus of claim 1, wherein the processing circuitry further configures the UE to receive, from a serving RRH, a network flag to inform the UE that the one-shot large UL timing adjustment is expected from the UE.

5. The apparatus of claim 1, wherein the processing circuitry further configures the UE to transmit, to a serving RRH, UE capability signaling including an indication whether the one-shot large UL timing adjustment is supported by the UE.

6. An apparatus for a user equipment (UE), the apparatus comprising memory and processing circuitry to configure the UE to:

switch from a serving remote radio head (RRH) of a serving cell to a neighboring RRH of the serving cell, the serving RRH and the neighboring RRH in a unidirectional high speed train (HST) deployment; and adjust timing for uplink frequency range 2 (FR2) transmission to the neighboring RRH using a one-shot uplink timing adjustment after switching from the serving RRH to the neighboring RRH, determine a value of a difference between an end of a first transmission from the neighboring RRH and an end of reception of the first transmission at the UE ($T_{p2}$) less a difference between an end of a second transmission from the serving RRH and an end of reception of the second transmission at the UE ($T_{p1}$);

determine whether the value is greater than a predetermined gradual timing adjustment set by a Third Generation Partnership Project (3GPP) specification; and apply the one-shot uplink timing adjustment in response to a determination that the value is greater than the predetermined gradual timing adjustment after switching from the serving RRH to the neighboring RRH, the one-shot uplink timing adjustment being twice the value, and wherein the memory is configured to store the one-shot uplink timing adjustment.

7. An apparatus for a $5^{th}$ generation NodeB (gNB), the apparatus comprising memory and processing circuitry to configure the gNB to:

receive, from a user equipment (UE), UE capability signaling including an indication whether a one-shot uplink timing adjustment is supported by the UE;

transmit, to the UE, a network flag to inform the UE that the one-shot uplink timing adjustment is expected from the UE;

receive, from the UE, first uplink frequency range 2 (FR2) signals transmitted at a serving remote radio head (RRH), the first uplink FR2 signals transmitted at a first timing; and receive, from the UE, second uplink FR2 signals transmitted at a neighboring RRH after the UE has switched to the neighboring RRH, the serving RRH and the neighboring RRH in a unidirectional high speed train (HST) deployment, the second uplink FR2 signals transmitted at a second timing using the one-shot uplink timing adjustment, and wherein:

the one-shot uplink timing adjustment is applied in response to a determination that a first value is greater than a second value, the first value is a difference between an end of a first transmission from the neighboring RRH and an end of reception of the first transmission at the UE ($T_{p2}$) less a difference between an end of a second transmission from the serving RRH and an end of reception of the second transmission at the UE ($T_{p1}$), the second value is one of:

a predetermined gradual timing adjustment set by a Third Generation Partnership Project (3GPP) specification, a first combination of the predetermined gradual timing adjustment plus a timing error limit, a second combination of the predetermined gradual timing adjustment plus twice a downlink error, and a multiple of the predetermined gradual timing adjustment, and the one-shot uplink timing adjustment is twice the first value, wherein the memory is configured to store the one-shot uplink timing adjustment.

8. The apparatus of claim 7, wherein the one-shot uplink timing adjustment is applied with Transmission Configuration Indicator (TCI) state switching.

9. The apparatus of claim 7, wherein the processing circuitry further configures the gNB to transmit, from the serving RRH, information of the deployment, the information comprising at least one of Transmission Configuration Indicator (TCI) state to RRH mapping, number of beams per RRH and number of RRHs per gNB, and distance between neighboring RRHs.

10. The apparatus of claim 7, wherein an accuracy of the one-shot uplink timing adjustment is four times a downlink timing estimation and quantization error due to a time chip granularity, the time chip granularity derived from a downlink sampling time interval as $1/(2\Delta f_{max}*N_f)$, where $\Delta f_{max}$ is a subcarrier spacing (SCS) size and $N_f$ is a fast Fourier transform (FFT) size.

11. A non-transitory computer-readable storage medium that stores instructions for execution by one or more processors of a user equipment (UE), the one or more processors to configure the UE to, when the instructions are executed:

switch from a serving remote radio head (RRH) of a fifth generation (5G) nodeB (gNB) to a neighboring RRH of the gNB, the serving RRH and the neighboring RRH in a unidirectional high speed train (HST) deployment;

adjust timing for uplink frequency range 2 (FR2) transmission to the neighboring RRH using a one-shot uplink timing adjustment after switching from the serving RRH to the neighboring RRH;

apply the one-shot uplink timing adjustment in response to a determination that a first value is greater than a second value, the first value is a difference between an end of a first transmission from the neighboring RRH and an end of reception of the first transmission at the UE ($T_{p2}$) less a difference between an end of a second transmission from the serving RRH and an end of reception of the second transmission at the UE ($T_{p1}$), the second value is one of:

a predetermined gradual timing adjustment set by a Third Generation Partnership Project (3GPP) specification, a first combination of the predetermined gradual timing adjustment plus a timing error limit, a second combination of the predetermined gradual timing adjustment plus twice a downlink error, and a multiple of the predetermined gradual timing adjustment, and the one-shot uplink timing adjustment is twice the first value.

* * * * *